US 10,843,736 B2

(12) United States Patent
Tchepikov et al.

(10) Patent No.: US 10,843,736 B2
(45) Date of Patent: Nov. 24, 2020

(54) REINFORCEMENT MEMBER FOR A SIDE SILL OF A VEHICLE

(71) Applicant: Ford Global Technologies LLC, Dearborn, MI (US)

(72) Inventors: Igor Tchepikov, Point Cook (AU); Josh Miller, Sunbury (AU); Anand Singaram, Melbourne (AU); Michael Paradisis, Campbellfield (AU); Guru Pradeep Palle, Epping (AU)

(73) Assignee: Ford Global Technologies LLC, Dearborn, MI (US)

( * ) Notice: Subject to any disclaimer, the term of this patent is extended or adjusted under 35 U.S.C. 154(b) by 43 days.

(21) Appl. No.: 16/240,263

(22) Filed: Jan. 4, 2019

(65) Prior Publication Data

US 2019/0217898 A1 Jul. 18, 2019

(30) Foreign Application Priority Data

Jan. 18, 2018 (CN) .......................... 2018 1 0048324

(51) Int. Cl.
*B62D 25/02* (2006.01)
*B62D 29/00* (2006.01)
*B62D 21/15* (2006.01)

(52) U.S. Cl.
CPC ......... *B62D 25/025* (2013.01); *B62D 29/007* (2013.01); *B62D 21/157* (2013.01)

(58) Field of Classification Search
CPC ... B62D 29/007; B62D 21/157; B62D 25/025
USPC ....................................................... 296/209
See application file for complete search history.

(56) References Cited

U.S. PATENT DOCUMENTS

| 6,059,899 A | 5/2000 | Shibata et al. |
| 8,136,871 B2 | 3/2012 | Yoshida et al. |
| 8,979,173 B2 * | 3/2015 | Kojo .................. B62D 25/2036 |
| | | 296/187.08 |
| 2011/0233970 A1 * | 9/2011 | Nagai .................... B62D 25/02 |
| | | 296/203.03 |

(Continued)

FOREIGN PATENT DOCUMENTS

| CN | 201275998 Y | 7/2009 |
| DE | 202017100899 U1 | 3/2017 |
| WO | 2016046590 A1 | 3/2016 |

OTHER PUBLICATIONS

Martensitic Steels http://automotive.arcelormittal.com/repository2/Automotive_Product%20offer/MartensiticSteels.pdf.

(Continued)

*Primary Examiner* — Joseph D. Pape
*Assistant Examiner* — Dana D Ivey
(74) *Attorney, Agent, or Firm* — David Coppiellie; Kolitch Romano LLP

(57) ABSTRACT

A reinforcement member for a side sill of a vehicle is provided. The reinforcement member comprises an elongated hollow body having a closed cross section. The elongated hollow body includes a first coordinating wall and an access wall adjacent to the first coordinating wall. The access wall includes plurality of weld access openings along a longitudinal direction. The first coordinating wall is spot welded to a first mating surface of the side sill via plurality of weld access openings. The elongated hollow body is manufactured from ultra high strength martensitic steel by roll forming process.

20 Claims, 7 Drawing Sheets

(56) References Cited

U.S. PATENT DOCUMENTS

2014/0191536 A1    7/2014   Elfwing et al.

OTHER PUBLICATIONS

Martensitic (MS) Steel http://www.worldautosteel.org/steel-basics/steel-types/martensitic-ms-steel/.

* cited by examiner

REINFORCEMENT MEMBER FOR A SIDE SILL OF A VEHICLE

RELATED APPLICATION

This application claims the benefit of Chinese Patent Application No.: CN 201810048324.0 filed on Jan. 18, 2018, the entire contents thereof being incorporated herein by reference.

FIELD

The present disclosure relates to a reinforcement member for a side sill of a vehicle and a side sill assembly of a vehicle.

BACKGROUND

A side sill is a body section below the base of the door openings of a vehicle body. Typically, the side sill is reinforced to improve crash energy management in the event of an external impact. The reinforcement can be achieved by connecting a reinforcement member to the side sill along a length of the side sill. Conventional reinforcement members for a side sill are made from steel such as Boron press hardened steel and the reinforcement structure can be heavy and costly to fabricate. It is desirable for a reinforced side sill to have a relatively light weight while improving weight to crash energy management efficiency.

SUMMARY

According to one aspect of the present disclosure, a reinforcement member for a side sill of a vehicle is provided. The reinforcement member is disposed inside the side sill and comprises an elongated hollow body having a closed cross section. The elongated hollow body includes a first coordinating wall and an access wall adjacent to the first coordinating wall. The access wall includes a plurality of weld access openings along a longitudinal direction and the first coordinating wall is spot welded to a first mating surface of the side sill via the plurality of weld access openings.

In one embodiment, the hollow elongated body may further comprise a second coordinating wall opposite to the access wall. The second coordinating wall is spot welded to a second mating surface of the side sill via the plurality of weld access openings.

In another embodiment, the weld access openings may be sized to allow passing through of a tip of a welding machine.

In another embodiment, the reinforcement member may be substantially linear along the longitudinal direction.

In another embodiment, the reinforcement member may have a cross-section that is uniform along the longitudinal direction.

In another embodiment, the reinforcement member may extend substantially along the length of the side sill.

In another embodiment, the first coordinating wall may be spot welded to the first mating surface at varied intervals along the longitudinal direction.

In another embodiment, the hollow body may be formed by roll forming a sheet metal to a predetermined shape and joining edges along the longitudinal direction by seam welding to form the closed cross section.

In another embodiment, the hollow body may be made of ultra-high strength martensitic steel In another embodiment, the hollow body may be of size smaller than the side sill to provide clearance between the body and the side sill upon welding the body to the side sill.

In another embodiment, the clearance between the body and side sill, and the weld access opening may be configured to allow circulation of paint emulsion in E-coating process.

According to another aspect of the present disclosure, a side sill assembly comprises a side sill and a reinforcement member disposed inside the side sill. The side sill extends in a longitudinal direction and includes a first mating surface and a second mating surface. The reinforcement member extends substantially along the length of side sill and includes an elongated hollow body. The elongated hollow body comprises a first coordinating wall, an access wall adjacent to the first coordinating wall and a second coordinating wall opposite to the access wall. The access wall includes a plurality of weld access openings along the longitudinal direction. The first coordinating wall is spot welded to the first mating surface via the plurality of weld access openings and the second coordinating wall is spot welded to the second mating surface via the plurality of weld access openings.

In one embodiment, the hollow body may be formed by roll forming a martensitic steel sheet to a predetermined shape and joining the longitudinal edges by seam welding to form the closed cross section.

In another embodiment, the reinforcement member may be substantially linear along the longitudinal direction.

In another embodiment, the side sill may include an inner shell and an outer shell. The inner shell is close to an interior of the vehicle and connected to a vehicle floor. The outer shell is opposite to the inner shell and connected to a side structure of the vehicle. The reinforcement member is welded to the outer shell of the side sill.

In another embodiment, the reinforcement member may include a first segment disposed at a front portion of the vehicle. The reinforcement member may be welded to the side sill such that a weld density is higher in a first segment of the reinforcement In another embodiment, the reinforcement member may be welded to an A-pillar and a B-pillar at the longitudinal direction, and a weld density at segments corresponding to the A-pillar and the B-pillar are higher than segments disposed under door openings.

In another embodiment, the hollow body may further comprise a first connection wall disposed between the first coordinating wall and the second coordinating wall such that the first connection wall, the first mating surface and the second mating surface define a first clearance along the longitudinal direction to allow for E-coat circulation to facilitate formation of desired coating thickness.

In another embodiment, the hollow body may further comprise a second connection wall between the second coordinating wall and a bottom wall. The second connection wall may be spaced apart from the side sill to define a second clearance along the longitudinal direction to allow for electro-coat circulation and to facilitate formation of desired coat thickness.

The reinforcement member of the present disclosure is made of martensitic steel and fabricated by roll forming and has a closed cross section. Martensitic steel reduces the weight of reinforcement member and roll forming process reduces fabrication tooling cost compared to hydro formed and hot stamped design. The reinforcement member comprises an elongated hollow body having the first coordination wall and the access wall having plurality of weld access opening adjacent to the first coordination wall. The weld access openings allow passing through of tips of welding machine to spot weld elongated body to the side sill and the weld density may be varied. Spot welding at varied intervals along the longitudinal direction improves the joint stiffness between the reinforcement member and the side sill. The reinforcement member further comprises a second coordination wall opposite the access wall which are connected to the side will while the other walls are de-coordinated. A side sill assembly of the present disclosure can improve the weight to crash energy management efficiency of the side sill. Further, the clearances between the reinforcement member and the side sill provide better circulation of paint emulsion during electro-coating painting process.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed reinforcement members for a side sill and the side sill assemblies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various reinforcement members and side sill assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
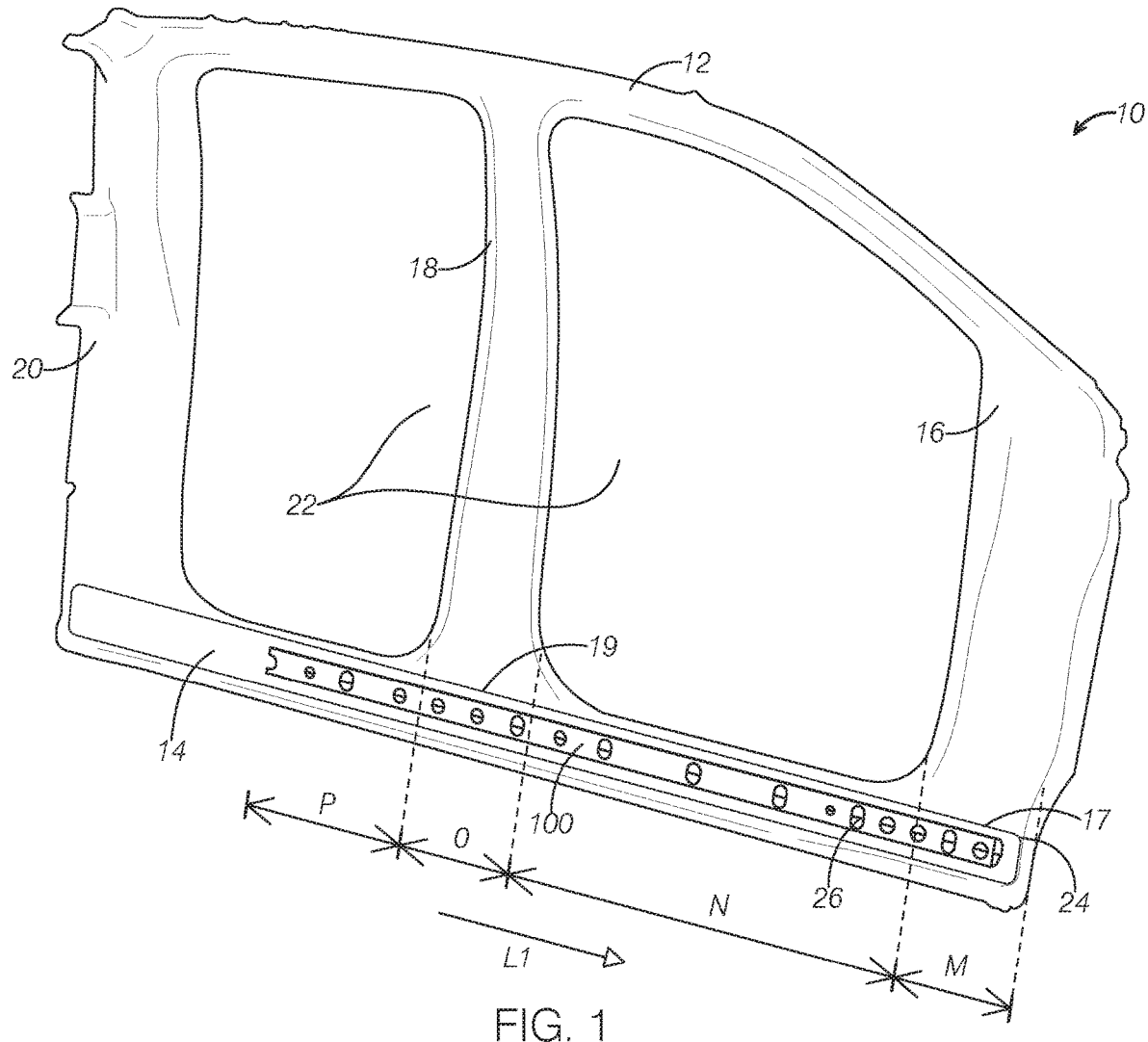
FIG. 1 is a schematic diagram of a side structure of a vehicle body, illustrating a position of a reinforcement member in a side sill according to one embodiment of the present disclosure.

FIG. 1 is a schematic diagram of a side structure 10 of a vehicle body according to one embodiment of the present disclosure. A side sill 14 or a rocker is a body section below the base of the door openings of a vehicle. The side structure 10 comprises a roof frame 12 at an upper section, an A-pillar 16, a B-pillar 18 and a C-pillar 20, door openings 22, and a side sill 14 disposed under the door openings 22. The side sill 14 may extend in a longitudinal direction L1 from an A-pillar 16 to the C-pillar 20. A reinforcement member 100 is disposed in the side sill 14 and connected to the side sill 14. The reinforcement member 100 may extend substantially along the length of the side sill 14. In the depicted embodiment, the reinforcement member 100 extends to a front face 24 of the A-pillar 16. As the reinforcement member 100 is located in the front portion of the vehicle, the load management in a front impact and an offset impact can be improved. In some embodiments, the reinforcement member 100 extends to a location adjacent to a C-pillar 20 and spaced away from the C-pillar. The reinforcement member 100 may be a linear along its length. The length of the reinforcement member 100 may be configured to absorb energy of the collision to maintain the integrity of the side sill. It should be appreciated that the reinforcement member of the present disclosure may be used in a vehicle having a D-pillar. The length, size and location of the reinforcement member may be configured to strengthen the side sill or the vehicle body to have desired rate of crash energy management.

In some embodiments, the reinforcement member 100 may be made from a light weight material. In some embodiment, the reinforcement member is made of ultra-high strength martensitic steel and has a closed cross-section. The reinforcement member 100 may be formed by roll forming a sheet metal to a predetermined shape and joining edges along the longitudinal direction L1 by seam welding to form the closed cross section. In some embodiments, the reinforcement member 10 includes plurality of weld access opening 26 along the longitudinal direction L1. The weld access openings 26 allow passing through of a tip of welding machine to spot weld the reinforcement member 100 to the side sill 14 at a predetermined interval along the longitudinal direction L1. The closed section provides better sectional properties compared to an open section of a reinforcement structure in conventional technologies. Further, the closed section can increase resistance to buckling.

FIG. 1 further shows that the reinforcement member 100 includes a segment M disposed at a base portion 17 of the A-pillar 16 and a segment O disposed at a base portion 19 of the B-pillar 18 and segments N, P disposed under the door openings 22. The segments M, N, O, P may be connected to the side sill 14 and/or the body structure 12 along the longitudinal direction L of the vehicle.

Figure 2:
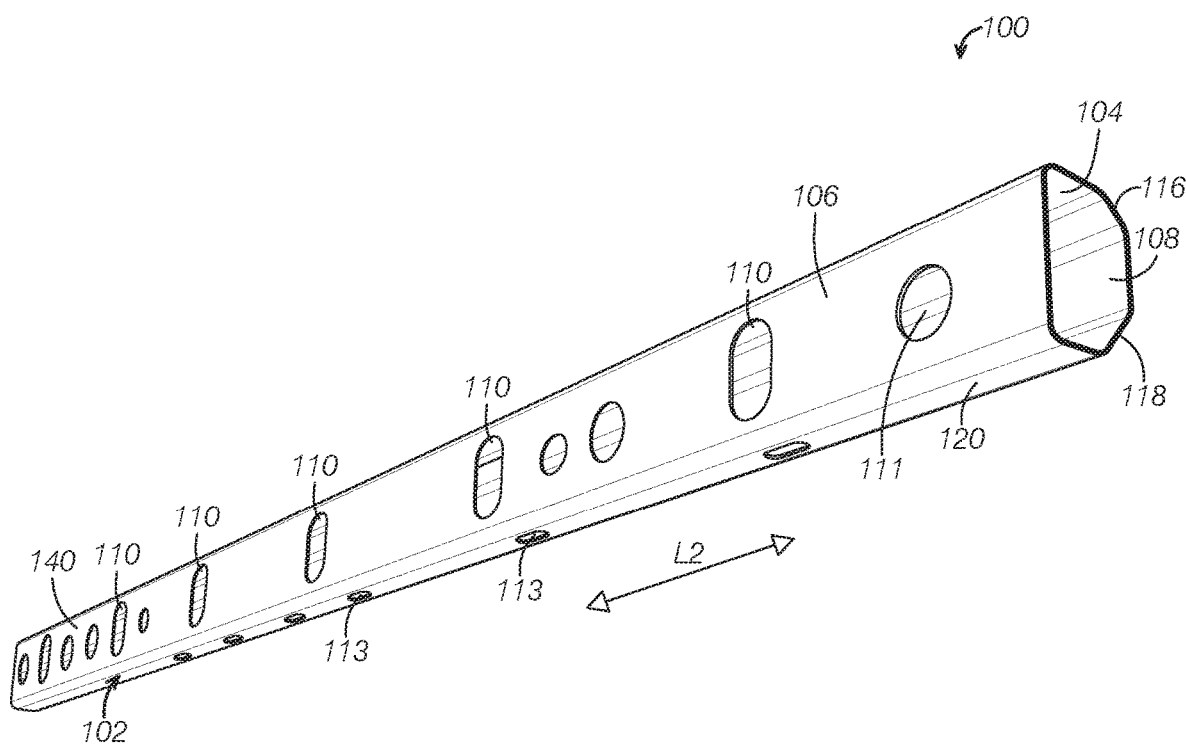
FIG. 2 is a perspective view of a reinforcement member according to one embodiment of the present disclosure.

FIG. 2 is a perspective view of the reinforcement member 100 in FIG. 1. The reinforcement member 100 comprises an elongated hollow body 102. The body 102 may have a closed cross section. In some embodiments, the cross section of the body 102 may be uniform along its length at a direction L2. In some embodiment, the reinforcement member 100 may be made from high strength Martensitic steel. The uniform configuration of the body 102 along its lengthwise direction L2 allows the reinforcement member 102 to be rolled to form the closed cross section. In some embodiments, the elongated body 102 is fabricated by roll forming a steel sheet to a predetermined shape and two edges are joined along the lengthwise direction L2. In some embodiments, the two edges along the lengthwise direction are joined by seam welding. The roll forming is flexible to accommodate design changes, has lower tooling costs and can be set up to produce a hollow body with different cross sections and lengths.

The reinforcement member 100 may comprise a first coordinating wall 104, an access wall 106 adjacent to the first coordinating wall 104 and a second coordinating wall 108 opposite to the access wall 106. The first and second coordinating walls 104, 108 are the walls that are connected to the side sill 14 or other vehicle body structures such as A-pillar 16 and B-pillar 18. The access wall 106 may comprise a plurality of weld access openings 110 along the lengthwise direction L2. The weld access openings 110 are configured to allow an insertion of a tip of a weld machine such that the first and second coordinating walls 104, 108 can be connected to the side sill 14 via welding. In some embodiments, the weld access openings 110 may be configured to allow an insertion of the weld machine at two directions as described in FIGS. 6, 7 such that one weld access opening 110 can allow spot welding at two walls, i.e., the first coordinating wall 104 and the second coordinating wall 108.

In some embodiments, the access wall 106 may further include a supplemental weld access opening 111 configured to allow spot welding of the second coordinating wall 108. The supplement access opening 111 may be smaller than the weld access opening 110. Further, the reinforcement member 100 may include a plurality of apertures 113 to allow circulation of E-coating.

In some embodiments, the reinforcement member 100 may further comprise a first connection wall 116, a second connection wall 118. The first connection wall 116 may have an angle to the first coordinating wall 104 and is disposed between the first coordinating wall 104 and the second coordinating wall 108. The second connection wall 118 extends from the second coordinating wall 108 towards the access wall 106 and has an angle to the second coordinating wall 108. In some embodiments, the reinforcement member 100 may further include a bottom wall 120 substantially parallel to the first coordinating wall 104. The second connection wall 118 is disposed between the second coordinating wall 108 and the bottom wall 120. In the depicted embodiment, the cross section of the hollow body 102 has a polygon shape. It should be appreciated that the closed cross section may have any appropriate shapes tuned for optimal rate of crash energy management.

Figure 3:
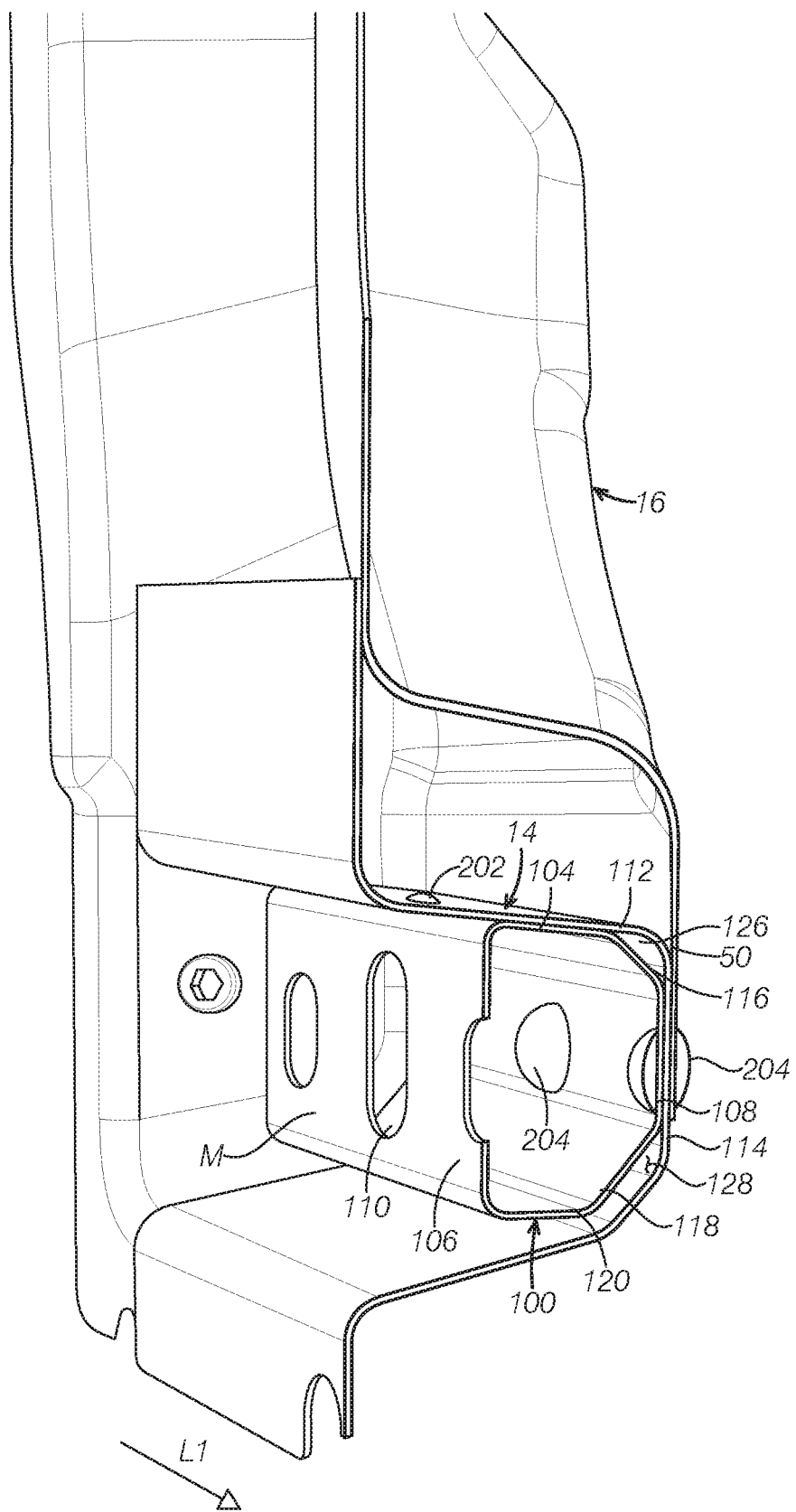
FIG. 3 is a perspective partial view of a vehicle body, illustrating a connection of a reinforcement member at a location adjacent to an A-pillar of a vehicle according to one embodiment of the present disclosure.

The reinforcement member 100 may be connected with two or more mating surfaces of the side sill via welding. FIG. 3 is a perspective partial view of the reinforcement member 100, illustrating a connection of the reinforcement member 100 to the side sill 14 and the A-pillar 16 of a vehicle. The first coordinating wall 104 of the reinforcement member 100 is connected to a first mating surface 112 of the side sill 120 by a plurality of first welds 202 at predetermined intervals along the longitudinal direction L1 of the vehicle. The longitudinal direction L1 is generally the same as the lengthwise direction L2 of the reinforcement member 100. One first weld 202 is shown in FIG. 3. The second coordinating wall 108 is connected to a second mating surface 114 of the side sill 14 by a plurality of second welds 204 at predetermined intervals along the longitudinal direction L1. On the segment M of the reinforcement member 100 corresponding to the A-pillar 16, the second coordinating wall 108 is connected to the second mating surface 114 and a base 50 of the of A-pillar 16. One set of the first weld 202 and the second weld 204 may be spot welds by a welding machine via one access opening 110. The connection of at the lengthwise direction structurally connects the reinforcement member 100, the side sill 120 and A-pillar 16.

Figure 4:
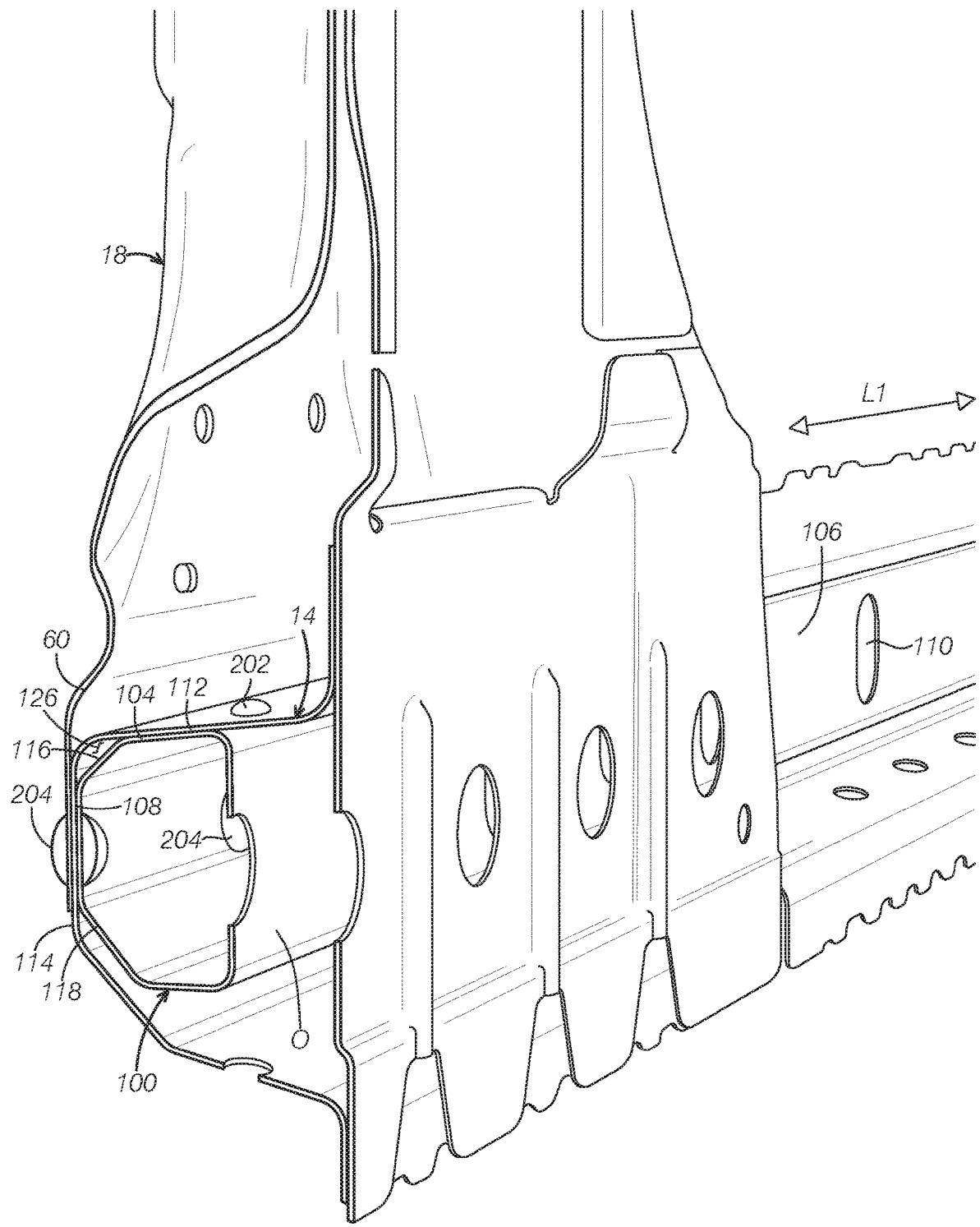
FIG. 4 is a perspective partial view of a vehicle body, illustrating a connection of a reinforcement member at a location adjacent to a B-pillar of a vehicle according to one embodiment of the present disclosure.

Similarly, the segment O of the reinforcement member 100 corresponding to the B-pillar 18 is connected to the side sill 14 and the B-pillar 18 and B-pillar 18 at the longitudinal direction L1. FIG. 4 shows the connection of the segment O of the reinforcement member 100 to the side sill 14 and the B-pillar 18. As can been seen, the first coordinating wall 104 of the reinforcement member 100 is connected to the first mating surface 112 of the side sill 16 by a plurality of first welds 202. The second coordinating wall 108 of the reinforcement member 100, the second mating surface 114 of the side sill 16 and a base 60 of the B-pillar 18 are welded by a plurality of second welds 204 to be structurally connected. The connection of at the lengthwise direction structurally connects the reinforcement member 100, the side sill 120 and B-pillar 16.

Figure 5:
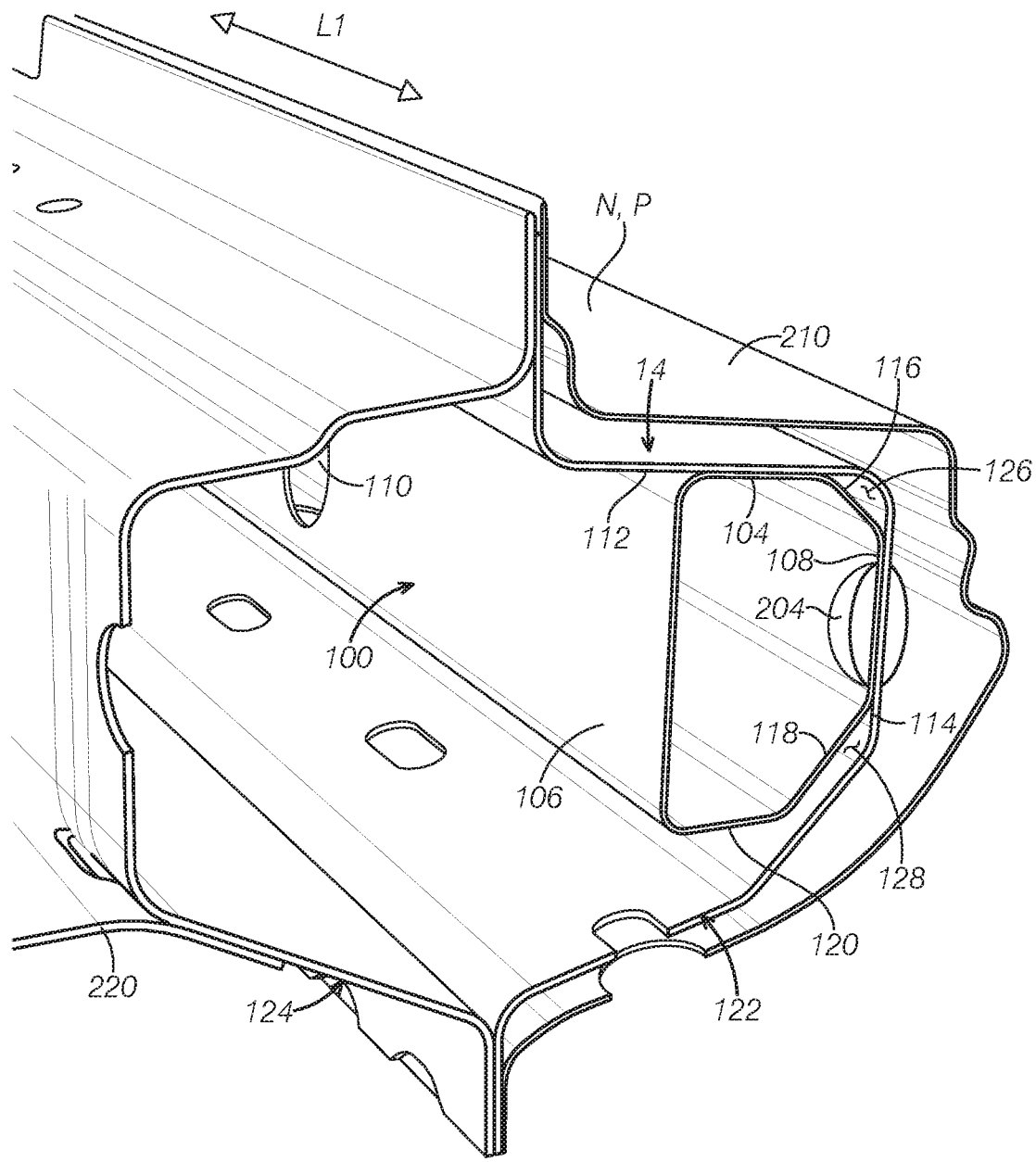
FIG. 5 is a perspective partial view of a reinforcement member connected to a side sill according to one embodiment of the present disclosure.

FIG. 5 shows example connection of segments N, P of the reinforcement member 100 to the side sill 14. With further reference to FIG. 1, the segments N, P are the portions of the reinforcement member 100 disposed under the door openings 22. The side sill 120 comprises an outer sill shell 122 and an inner sill shell 124 that are joined together to form an enclosed structure at the cross section. The outer sill shell 122 and the inner sill shell 124 are connected to an outer panel 210 of the vehicle and the inner sill shell 124 is connected to a vehicle floor 220. The reinforcement member 100 is disposed inside the outer sill shell 122. The first and second coordinating walls 104, 108 are connected to the first and second mating surfaces 112, 114, respectively by a plurality of welds along a longitudinal direction L1. With further reference to FIGS. 2-3, the reinforcement member 100 is connected to the side sill 14, the A-pillar 16 and B-pillar 18 to improve the structural integrity in a crash event by transferring the impact loads from the reinforcement member to the mating parts to engage a whole body structure in a single structural ring. The connection of the reinforcement member 100 with the side sill 14 at two faces (i.e., the first and second coordinating walls) stabilize the cross section and offer robust engagement with the surrounding structure and better crash energy management.

In some embodiments, the reinforcement member 100 may include the first connection wall 116 and the second connection wall 118, which are spaced apart from the side sill 14. That is, the un-welded walls of the reinforcement member 100 are de-coordinated from the other structures. The connection wall 116, the first mating surface 112 and the second mating surface 114 together define a first clearance 126 along the longitudinal direction L1. Similarly, the second connection wall 118 is spaced apart from the side sill 120 to define a second clearance 128 along the longitudinal direction L1. The open ends of the reinforcement member, the weld access openings, and the de-coordination of the un-welded walls 128 allow for sufficient E-coating circulation of paint emulsion during E-coating process and provide adequate coating thickness to prevent corrosion. Further, the clearances facilitate drainage of water and other contaminants and thus prevent in-field corrosion. Thus, the need for corrosion protection sealer is eliminated. In some embodiments, the reinforcement member 100 is sized smaller than the side sill 14. In one embodiment, the cross-section size of reinforcement member 24 enable easy loading of reinforcement member inside the side sill during an assembly process. In another embodiment, the cross-section size of reinforcement member provides second clearance 128 between reinforcement member and side sill upon connecting the reinforcement member to the side sill.

Figure 6:
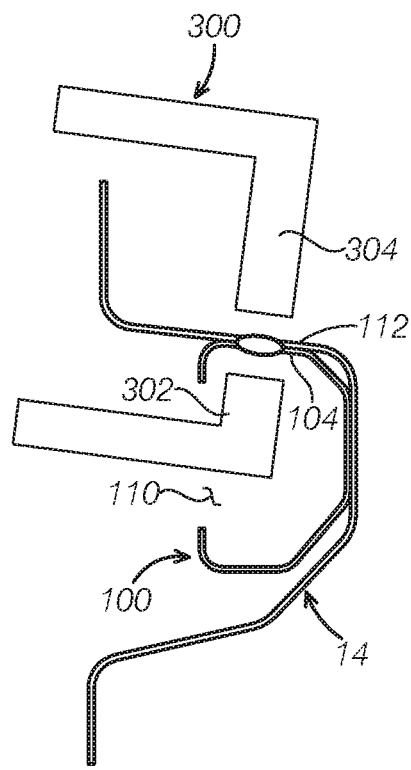
FIG. 6 is a cross sectional view of a side sill and a reinforcement member, illustrating spot welding of the reinforcement member to a first mating surface of the side sill according to one embodiment of the present disclosure.
Figure 7:
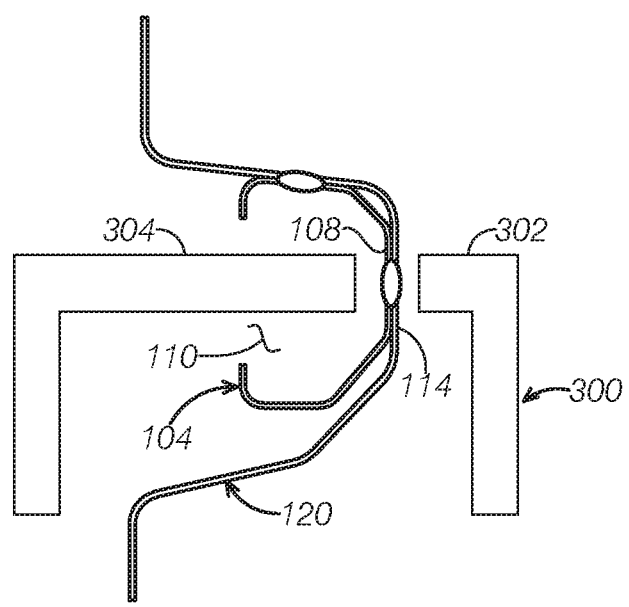
FIG. 7 is a cross sectional view of the side sill and the reinforcement member in FIG. 5, illustrating spot welding of the reinforcement member to a second mating surface of the side sill.

FIGS. 6-7 show an example spot welding of the reinforcement member 100 to the side sill 14. The first coordinating wall 104 is spot welded with first mating surface 112 by a welding machine 300. The weld access opening 110 is configured to allow the insertion of a first tip 302 and a second tip 304 of the welding machine 300. In some embodiments, the first and second tips 302, 304 of the spot welding machine 300 may be electrodes. FIG. 6 shows that the tips 302 and 304 are at a position to weld the first coordinating wall 104 and the first mating surface 112 of the side sill 14. FIG. 7 shows that the tips 302, 304 are at a position to weld the second coordinating wall 108 and the second mating surface 114. In some embodiments, one access opening 110 is used to perform one set of welds in both the first coordinating wall 104 and second coordinating wall 108.

Figure 8:
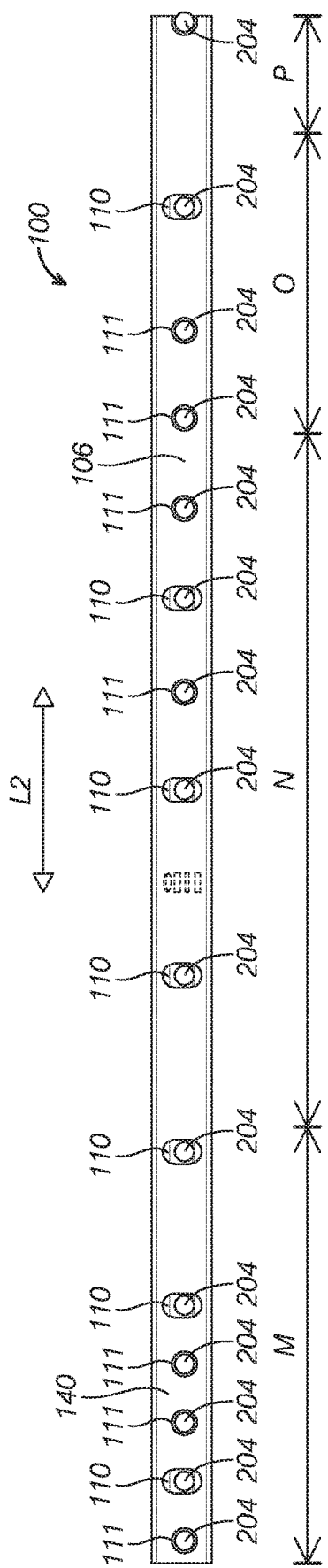
FIG. 8 is a side view of a reinforcement member, illustrating a plurality of welds on the second coordinating wall of the reinforcement member according to one embodiment of the present disclosure.
Figure 9:
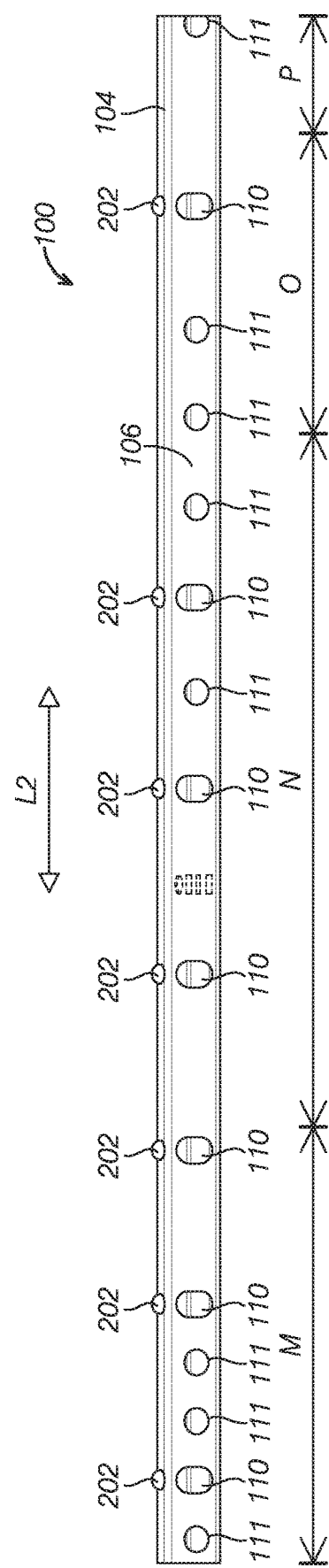
FIG. 9 is a side view of the reinforcement member, illustrating a plurality of welds on the first coordinate wall of the reinforcement member.

The plurality of weld access openings 110 in the access wall 106 may be located in a way to both control deformation of the reinforcement member and position the welds for optimal energy transfer. FIGS. 8 and 9 show the access wall 106 of the reinforcement member 100. The plurality of weld access openings 110 are configured to enable the spot welding both the first coordinating wall 104 with the first mating surface 112 and spot weld of the second coordinating wall 108 with the second mating surface 114 at the plurality of points. In the depicted embodiment, the access wall 106 further includes a plurality of supplemental weld access openings 111 to allow spot welding of the second coordinating wall 108 to the second mating face 114. A higher density of welds may improve the function of preventing the side sill from buckling. In some embodiments, a weld density at a front portion 140 of the reinforcement member 100 corresponding to a front of a vehicle may be highest to provide strong connection to the surrounding structure. In some embodiments, the segments M, O corresponding to the A-pillar and B-pillar of the vehicle may have a high weld density. In some embodiments, a distance between two welds may be in a range of about 35 mm to about 400 mm. In some embodiments, the distance between two welds may be about 35 mm at the front portion 140 or the portions corresponding to A-pillar and B-pillar along at a lengthwise direction L2.

FIG. 8 shows the second welds 204 in the second coordinating wall 108 which can be seen through the weld access openings 110 and the supplement access openings 111. FIG. 9 shows a plurality of first welds 202 on the first coordinating wall 104. In some embodiments, One set of welds in both the first coordinating wall 104 and the second coordinating wall 108 are performed through the same weld access opening 110. In the depicted embodiment, the weld access opening 110 has an oval shape. It should be appreciated that the weld access opening 110 may have any appropriate shapes. The weld access opening 110 has a large size than the supplement weld access opening 111. The joint stiffness between the reinforcement member 100 and the side sill 120 increases with increasing number of welds along the longitudinal direction. The number and position of weld access opening 110 are optimized to improve the crash energy management.

The reinforcement members of a side sill and the side sill assemblies of the present disclosure have various advantages. For example, the weight of the side sill assembly is reduced by improving weight to crash energy management efficiency. Further, the reinforcement member requires less tooling investment due to the use of the roll forming process.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A reinforcement member disposed inside a side sill of a vehicle, the reinforcement member comprising:
   an elongated hollow body having a closed cross section, including
   a first coordinating wall; and
   an access wall adjacent to the first coordinating wall and including a plurality of weld access openings along a longitudinal direction;
   wherein the first coordinating wall is to be spot welded to a first mating surface of the side sill via the plurality of weld access openings.

2. The reinforcement member of claim 1, wherein the elongated hollow body further comprises a second coordinating wall opposite to the access wall, wherein the second coordinating wall is to be spot welded to a second mating surface of the side sill via the plurality of weld access openings.

3. The reinforcement member of claim 2, wherein the weld access openings are sized to allow passing through of a tip of a welding machine.

4. The reinforcement member of claim 2, wherein the reinforcement member is substantially linear along the longitudinal direction.

5. The reinforcement member of claim 2, wherein the cross section of the elongated hollow body is uniform along the longitudinal direction.

6. The reinforcement member of claim 2, wherein the reinforcement member extends substantially along a lengthwise direction the length of the side sill.

7. The reinforcement member of claim 2, wherein the first coordinating wall is spot welded to the first mating surface at varied intervals along the longitudinal direction.

8. The reinforcement member of claim 2, wherein the elongated hollow body is formed by roll forming a sheet metal to a predetermined shape and joining edges along the longitudinal direction by seam welding to form the closed cross section.

9. The reinforcement member of claim 8, wherein the elongated hollow body is made of ultra-high strength martensitic steel.

10. The reinforcement member of claim 2, wherein a cross section of the elongated hollow body is of size smaller than a cross section of the side sill to provide clearance between the elongated hollow body and the side sill upon welding the elongated hollow body to the side sill.

11. The reinforcement member of claim 10, wherein at least one of the clearance and the weld access openings is to allow circulation of paint emulsion in E-coating process.

12. A side sill assembly of a vehicle, comprising:
a side sill, wherein the side sill includes a first mating surface and a second mating surface and extends at a longitudinal direction;
a reinforcement member disposed inside the side sill along the longitudinal direction, and having an elongated hollow body including:
a first coordinating wall,
an access wall adjacent the first coordinating wall, wherein the access wall includes a plurality of weld access openings along the longitudinal direction,
a second coordinating wall opposite to the access wall;
wherein the first coordinating wall is spot welded to the first mating surface of the side sill via the plurality of weld accessing openings and the second coordinating wall is spot welded to the second mating surface of the side sill via the plurality of weld accessing openings.

13. The side sill assembly of claim 12, wherein the elongated hollow body is formed by roll forming a martensitic steel sheet to a predetermined shape and joining longitudinal edges by seam welding to form the closed cross section.

14. The side sill assembly of claim 13, wherein a weld density is higher in a first segment of the reinforcement member, wherein the first segment is at a front portion of the vehicle.

15. The side sill assembly of claim 12, wherein the reinforcement member is substantially linear along the longitudinal direction.

16. The side sill assembly of claim 12, wherein the side sill includes an inner shell close to an interior of the vehicle and connected to a vehicle floor and an outer shell opposing the inner shell and connected to a side structure of the vehicle, and wherein the reinforcement member is welded to the outer shell of the side sill.

17. The side sill assembly of claim 12, wherein the first coordinating wall and the second coordinating wall is spot welded to the first mating surface and the second mating surface, respectively, at a plurality of predetermined positions along the longitudinal direction.

18. The side sill assembly of claim 12, wherein the reinforcement member is further welded to an A-pillar and a B-pillar at the longitudinal direction, and wherein a weld density at segments corresponding to the A-pillar and the B-pillar are higher than segments disposed under door openings.

19. The side sill assembly of claim 12, wherein at least one of the weld access openings is configured to allow an insertion of a tip of a weld machine to weld both the first coordinating wall of the reinforcement member with the first mating surface of the side sill and the second coordinating wall of the reinforcement member with the second mating surface of the side sill.

20. The side sill assembly of claim 12, wherein the elongated hollow body further comprising a first connection wall between the first coordinating wall and the second coordinating wall, and the first connection wall, the first mating surface and the second mating surface define a first clearance along the longitudinal direction, wherein the elongated hollow body further comprising a second connection wall between the second coordinating wall and a bottom wall, and the second connection wall is spaced apart from the side sill to define a second clearance along the longitudinal direction, and wherein the first clearance and second clearance allow for E-coat circulation to facilitate formation of desired coating thickness during an E-coating process.

* * * * *